(12) United States Patent
Odaohhara (10) Patent No.: US 7,714,533 B2
(45) Date of Patent: May 11, 2010

(54) BATTERY CHARGING SYSTEM AND METHOD

(75) Inventor: Shigefumi Odaohhara, Yamato (JP)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 510 days.

(21) Appl. No.: 11/672,420

(22) Filed: Feb. 7, 2007

(65) Prior Publication Data

US 2007/0188135 A1    Aug. 16, 2007

(30) Foreign Application Priority Data

Feb. 7, 2006    (JP) .............................. 2006-029170

(51) Int. Cl.
*H02J 7/00*    (2006.01)
*H02J 7/06*    (2006.01)

(52) U.S. Cl. ...................... 320/106; 320/160; 320/164

(58) Field of Classification Search ................. 320/106, 320/160, 162–164
See application file for complete search history.

(56) References Cited

U.S. PATENT DOCUMENTS

| | | | | |
|---|---|---|---|---|
| 5,870,025 A | * | 2/1999 | Hinohara ............... | 340/636.12 |
| 5,963,010 A | * | 10/1999 | Hayashi et al. ............. | 320/106 |
| 2006/0087286 A1 | * | 4/2006 | Phillips et al. .............. | 320/114 |

FOREIGN PATENT DOCUMENTS

| | | |
|---|---|---|
| JP | 06-013111 | 1/1994 |
| JP | 06-121466 | 4/1994 |
| JP | 08-019184 | 1/1996 |
| JP | 08-138749 | 5/1996 |
| JP | 08-506448 | 7/1996 |
| JP | 08-265984 | 10/1996 |
| JP | 09-285026 | 10/1997 |
| JP | 11-215727 | 1/1998 |
| JP | 10-174300 | 6/1998 |
| JP | 2986059 | 1/1999 |
| JP | 2001-309568 | 4/2000 |
| JP | 2001-359245 | 12/2001 |
| JP | 2002-247847 | 8/2002 |
| JP | 2005-137074 | 5/2005 |

OTHER PUBLICATIONS

"Smart Battery Charger Specification", Revision 1.1, Dec. 11, 1998, SBS Implementers Forum.

* cited by examiner

*Primary Examiner*—Patrick J Assouad
*Assistant Examiner*—Richard V Muralidar
(74) *Attorney, Agent, or Firm*—Kunzler Needham Massey & Thorpe (57) ABSTRACT

A system and method are disclosed for charging battery packs. A battery pack connects to an external battery charger. A processor of the battery pack recognizes that the processor is connected the external battery charger. The external battery charger provides charging parameters to the battery pack. The processor sends charging parameters to the external battery in response to recognizing that the processor is connected to the external battery charger.

18 Claims, 9 Drawing Sheets

Prior Art

BATTERY CHARGING SYSTEM AND METHOD

CROSS-REFERENCES TO RELATED APPLICATIONS

This application claims priority of Japanese Patent Application No. 2006-029170, filed Feb. 7, 2006.

BACKGROUND OF THE INVENTION

1. Field of the Invention

This invention relates to a system for charging battery cells used in portable electronic equipment and, in particular, to a charging system including a charger having a simplified structure for a battery pack including a processor.

2. Description of the Related Art

Lithium-ion batteries and nickel-hydride batteries, which have high energy densities, are often used in laptop personal computers (hereinafter referred to as laptop PCs), which are typical portable electronic equipment, because the laptop PCs require higher central processing unit (CPU) operating frequencies, longer operating times in mobile environments, and smaller sizes and lighter weights. To charge and discharge these batteries, recharge and discharge currents and voltages must be precisely controlled. Therefore, rather than conventional battery packs having only battery cells in a housing, battery systems called "smart batteries" are commonly used in which a microcomputer provided in the battery pack itself communicates with a laptop PC to exchange information while controlling charge and discharge.

Smart batteries are battery systems that are compliant with specifications called the Smart Battery System (SBS) specification proposed by Intel Corporation and Duracell Inc. in the United States. The first version, version 0.9, of the SBS specification was disclosed in 1995 and the latest version is Version 1.1. The SBS specification's main aim was to unify methods for controlling charge and discharge, measuring capacities, and communicating with laptop PCs, which had been being developed by laptop PC manufacturers on their own, to enable a battery pack itself to perform control of charge and discharge suitable to the chemical composition of the battery pack, thereby relieving the laptop PC designers of recharge/discharge control design work. Battery packs compliant with the SBS specification are referred to herein intelligent batteries.

An intelligent battery includes battery cells, which are the main unit to be charged and discharged, and electric circuitry including a CPU, a current measurement circuit, a voltage measurement circuit, and sensors contained on a substrate. In addition, the intelligent battery communicates with an embedded controller provided in a laptop PC through a data line. The intelligent battery can cooperate with the laptop PC to change a power consumption mode of the laptop PC in accordance with the remaining capacity of the battery or to shut off the laptop PC after displaying a warning on a display if remaining capacity becomes small or some abnormality occurs on the battery.

Two types of intelligent battery chargers, Level 2 and Level 3, are defined in the section "4.2 Smart Battery Charger Types" of the SBS specification "Smart Battery Charger Specification" Revision 1.1, released Dec. 11, 1998. In the case of the Level 2 battery charger, the intelligent battery is a master device and the battery charger is a slave device following the directions of the intelligent battery. The intelligent battery sends information about a current and voltage required for charging to the battery charger through a data line. The battery charger outputs a current and voltage based on the information. The Level 3 battery charger has a charger master operation mode in which the battery charger is the master device and the intelligent battery is the slave device following the battery charger. The Level 3 battery charger also has the battery master mode of the Level 2 battery charger. In the charger master mode, the battery charger sends an inquiry about a current and voltage required for charging to the intelligent battery and outputs a current and voltage according to a replay to it.

While a laptop PC equipped with a battery pack is being supplied with power from an alternating current (AC) power source, the battery pack is concurrently charged through a battery charger contained in the laptop PC. The laptop PC can then be used in a mobile environment. A user using a laptop PC in a mobile environment for a long time must charge spare battery packs beforehand. This requires many external battery chargers and places an extra cost burden on the user.

Figure 7:
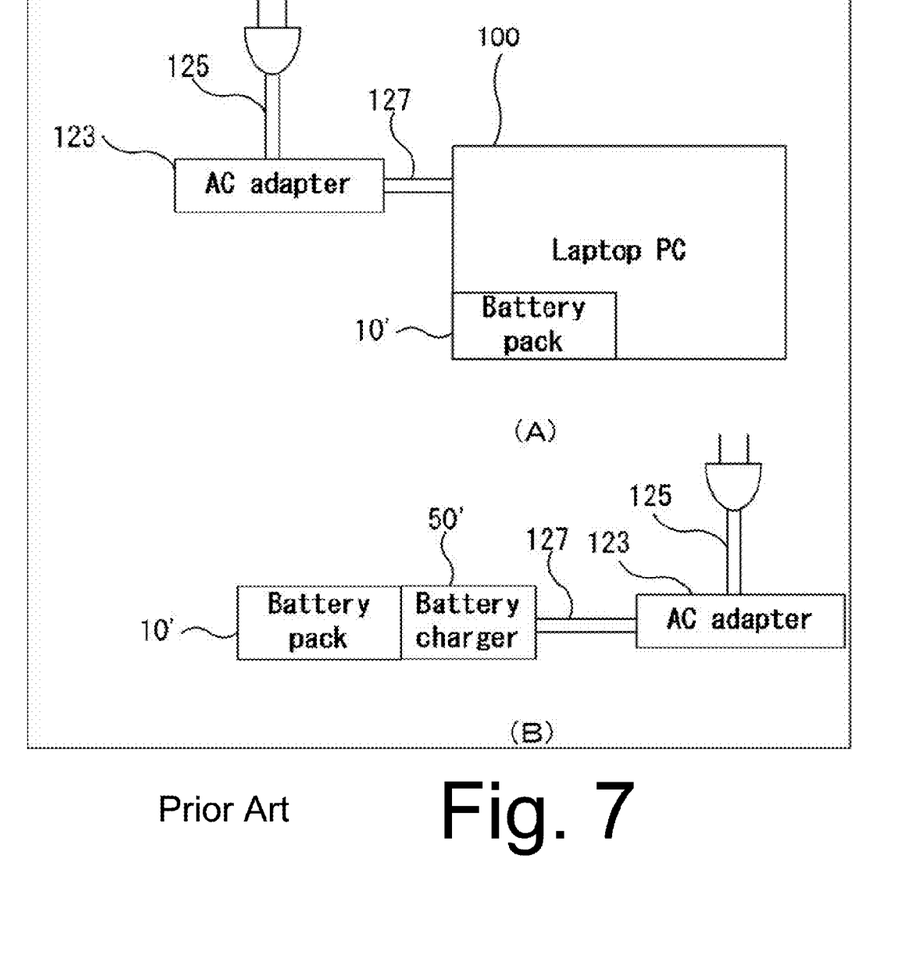
FIG. 7 shows a configuration of a conventional charging system.

FIG. 7 shows a basic configuration of a conventional charging system. FIG. 7(A) shows a conventional battery pack 10' attached to a laptop PC 100 being supplied with power from an AC power source. An AC adapter 123 is connected to the AC power source through an AC cord 125, converts an AC voltage to a predetermined direct current (DC) voltage, and supplies power to the laptop PC 100 through a DC cable 127. Power supplied to the laptop PC 100 is used by a system load of the laptop PC 100 and also used for charging the battery pack 10'. FIG. 7(B) shows the battery pack 10' attached to and charged by an external battery charger 50'. The same AC adapter 123 that is attached to the laptop PC 100 is connected to the battery charger 50'.

Figure 8:
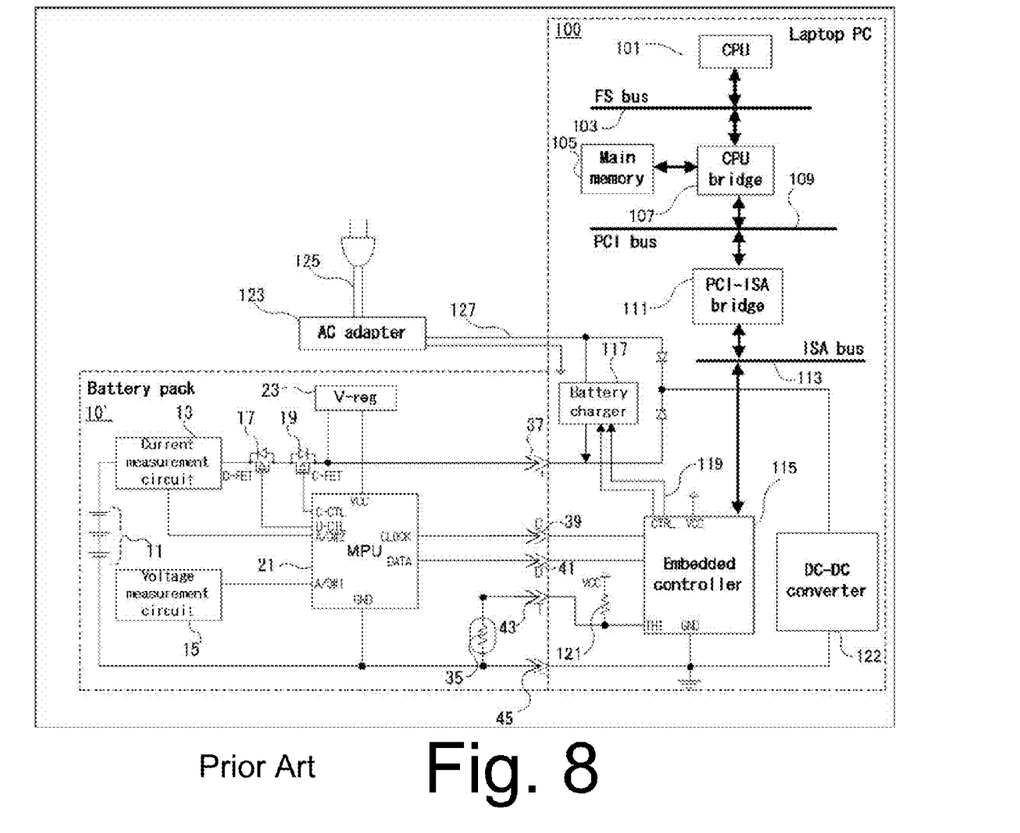
FIG. 8 shows a conventional battery pack attached to a laptop PC.

FIG. 8 shows in detail the conventional battery pack 10' shown in FIG. 7(A) attached to the laptop PC 100. The battery pack 10' is compliant with the SBS specifications. Provided in the battery pack 10' are battery cells 11 and electronic components such as a microprocessor unit (MPU) 21, a depletion field effect transistor (D-FET) 17, a complementary field effect transistor (C-FET) 19, a voltage regulator 23, a thermistor 35, a current measurement circuit 13, and a voltage measurement circuit 15. The battery pack 10' is connected to the laptop PC 100 through five terminals: a positive terminal 37, a C terminal 39, a D terminal 41, a T terminal 43, and a negative terminal 45. Power outputted from the battery cells 11 inside the battery pack 10' is provided to the laptop PC 100 through the positive terminal 37 and the negative terminal 45. The C terminal 39 and the D terminal 41 are connected to a clock terminal and a data terminal of the MPU 21, respectively, and the T terminal is connected to the thermistor 35.

The MPU 21 is an integrated circuit that operates on a constant voltage provided through the voltage regulator 23. The MPU 21 may include a CPU of 8 to 16 bits or so, a RAM, a ROM, an analog input and output, a timer, and a digital input and output in one package. In addition, the MPU 21 may be capable of executing a program for controlling the battery pack 10'. The MPU 21 uses the current measurement circuit 13 and the voltage measurement circuit 15 to constantly monitor the current and voltage output from the battery 11 and controls the D-FET 17 for discharging of the battery 11 and the C-FET 19 for charging of the battery 11. From the MPU 21, a clock line and a data line lead to the embedded controller 115 of the laptop PC 100 through the C terminal 39 and D terminal 41, respectively, so that the MPU 21 can communicate with the embedded controller 115.

The resistance of the thermistor 35 changes in accordance with temperature. In one embodiment, the thermistor 35 is provided near the battery cells 11 and is connected to a voltage source Vcc through a pull-up resistance 121 of the laptop PC 100, thereby functioning as a temperature measurement circuit. An output from the thermistor 35 is input into the embedded controller 115 through the T terminal 43. The thermistor 35 is used for measuring the temperature of a battery.

The power management function of the laptop PC 100 is implemented by the embedded controller 115 together with a battery charger 117, a control line 119, a DC-DC converter 122, and an AC adapter 123. The embedded controller 115 is an integrated circuit that controls the power supply as well as many hardware components constituting the laptop PC 100. The embedded controller 115 obtains information about the present current value and voltage value of the battery 11 through communication with the MPU 21 and, on the basis of the information, controls the battery charger 117 through the control line 119 to control charging of the battery pack 10'.

Power supplied from the AC adapter 123 and the battery pack 10' is provided to components in the laptop PC through the DC-DC converter 122. The embedded controller 155 is also connected onto an industry standard architecture (ISA) bus 113, from which the embedded controller 155 is interconnected with and can communicate with a CPU 101, a main memory 105, and other hardware components constituting the laptop PC 100 through connections, including a peripheral component interconnect (PCI) bus 109, a PCI-ISA bridge 111, a CPU bridge 107, and a front side (FS) bus 103. Most of the other hardware components comprising the laptop PC 100 such as a display, a magnetic disk, an optical disk, and a keyboard are well known and therefore not shown in FIG. 8.

Figure 9:
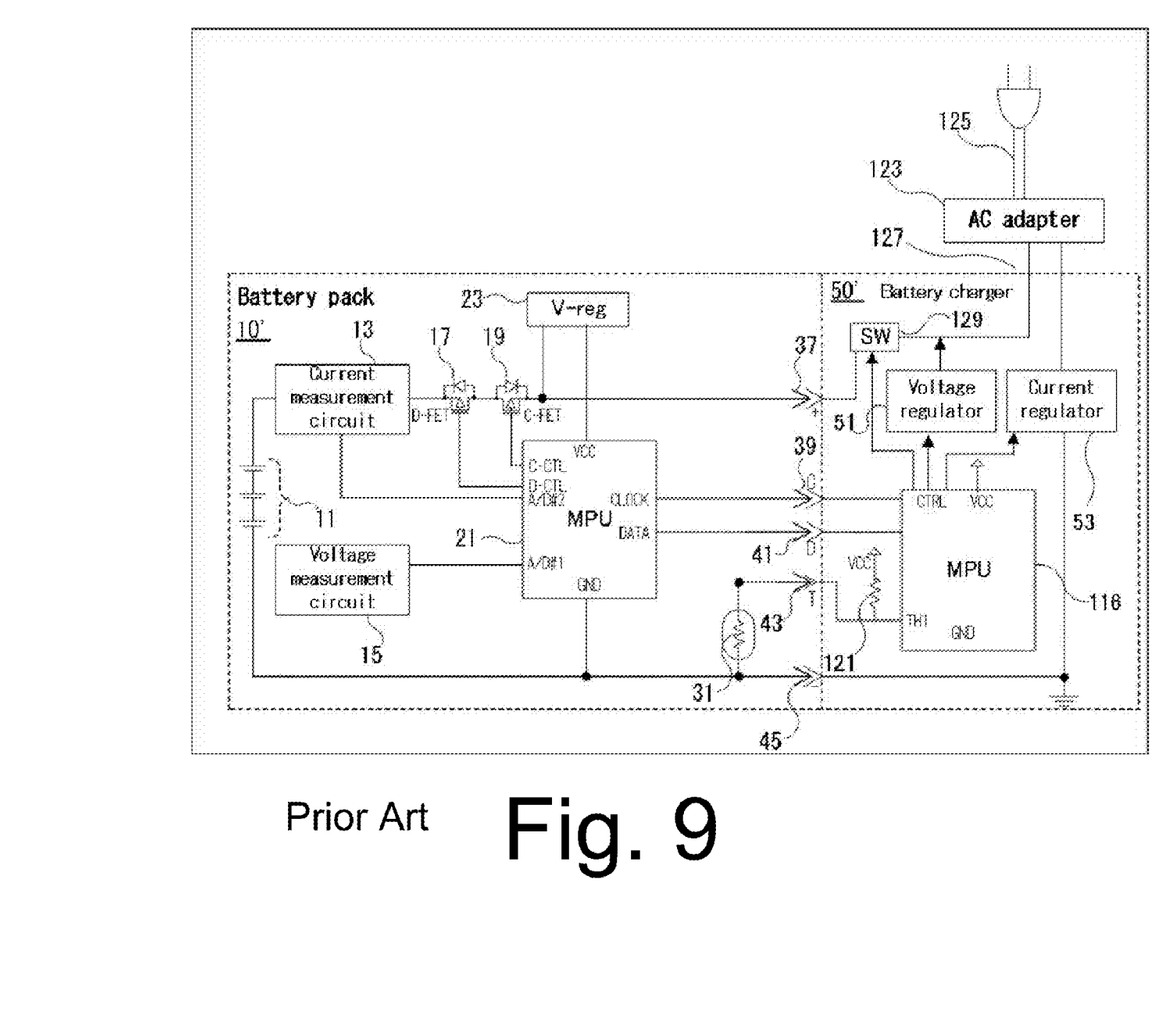
FIG. 9 shows the conventional battery pack attached to an external battery charger.

FIG. 9 shows in detail the battery pack 10' shown in FIG. 7(B) attached to an external battery charger 50'. The internal configuration of the battery pack 10' is the same as that of the battery pack 10' connected to the laptop PC 100 shown in FIG. 8. The battery charger 50' includes an MPU 116, a switch (SW) 129, a voltage regulator 51, and a current regulator 53. The MPU 116 plays a roll equivalent to the embedded controller 115 of the laptop PC 100 during charging the battery pack 10'. The MPU 116 obtains charging information such as the present current and voltage of the battery 11 through communication with the MPU 21 and, on the basis of the information, controls the SW 129, the voltage regulator 51, and the current regulator 53 to control charging in a manner similar to that in the laptop PC 100.

The conventional external battery charger 50' is capable of controlling charging of the battery pack 10' in a manner similar to that used in the battery charger 117 incorporated in the laptop PC 100. However, such an external battery charger 50' is costly because it uses an MPU 116. Therefore there is a demand for simplifying the structure of external battery chargers to reduce their costs.

SUMMARY OF THE INVENTION

From the foregoing discussion, there is a need for an apparatus, system, and method that charges a battery pack. Beneficially, such an apparatus, system, and method would simplify the structure of external battery chargers.

The present invention has been developed in response to the present state of the art, and in particular, in response to the problems and needs in the art that have not yet been fully solved by currently available battery charging methods. Accordingly, the present invention has been developed to provide a charging system and method for battery charging that overcome many or all of the above-discussed shortcomings in the art.

A charging system for a battery pack of the present invention is presented. In particular, the system, in one embodiment, includes an external battery charger and a battery pack. The external battery charger includes an identification circuit and a charging regulator. The external battery charger controls charging characteristics of the charging regulator in accordance with charging parameter values received from an external source.

The battery pack is attachable to an electronic apparatus having an identification circuit. In addition, the battery pack includes a battery cell and a processor capable of recognizing the identification circuit of the electronic apparatus and the identification circuit of the external battery charger and, upon recognizing the identification circuit of the external battery charger, sending the charging parameter values to the charging regulator. The charging system recognizes and sends the charging parameter values to the charging regulator to control charging of the battery pack, simplifying the structure of the external battery charger.

A method of the present invention is also presented for charging a battery pack. The method in the disclosed embodiments substantially includes the steps to carry out the functions presented above with respect to the operation of the described system.

A battery pack connects to an external battery charger. A processor of the battery pack recognizes that the processor is connected the external battery charger. The external battery charger provides charging parameters to the battery pack. The processor sends charging parameters to the external battery in response to recognizing that the processor is connected to the external battery charger. The method controls the controls the charging of the battery pack by the external battery charger with the charging parameters, simplifying the structure of the external battery charger.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention charges battery packs with a simplified external battery charger structure. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
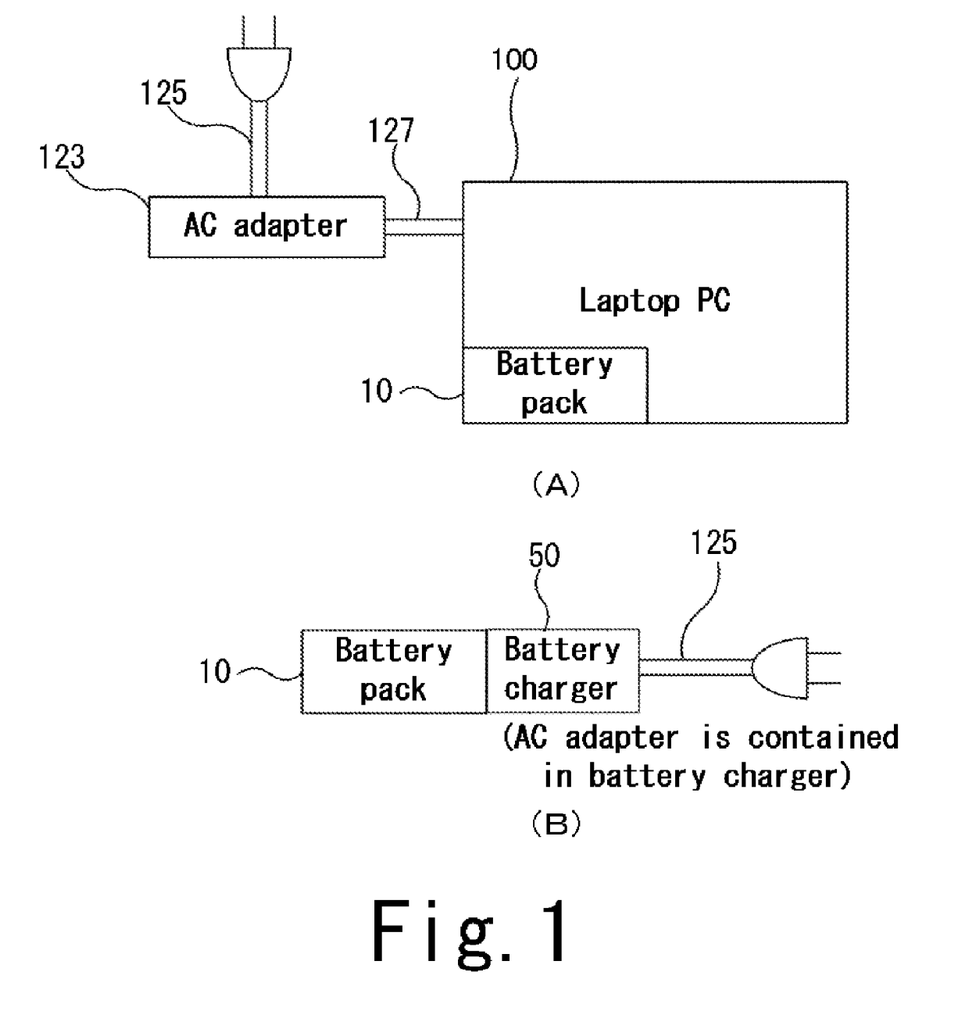
FIG. 1 shows a configuration of a charging system to which an embodiment of the present invention is applied.

The present invention will be described below in detail with respect to an embodiment shown in the accompanying drawings. FIG. 1 shows a configuration of a charging system to which an embodiment of the present invention can be applied. FIG. 1(A) shows a battery pack 10 attached to a laptop PC 100 being supplied with power from an AC power source. The laptop PC 100 operates on a DC voltage supplied from an AC adapter 123 and concurrently charges a laptop PC 10. The AC adapter 123 converts an AC voltage supplied from a commercial power source through an AC cord 125 to a predetermined DC voltage and supplies the DC voltage to the laptop PC 100 through a DC cable 127. The battery pack 10 is an intelligent battery compliant with the SBS specification. FIG. 1(B) shows the battery pack 10 attached to an external battery charger 50 being supplied with power from a commercial power source through the AC cord 125. The battery charger 50 is integrated with an AC adapter and operates on AC power supplied directly through the AC cord 125.

Figure 2:
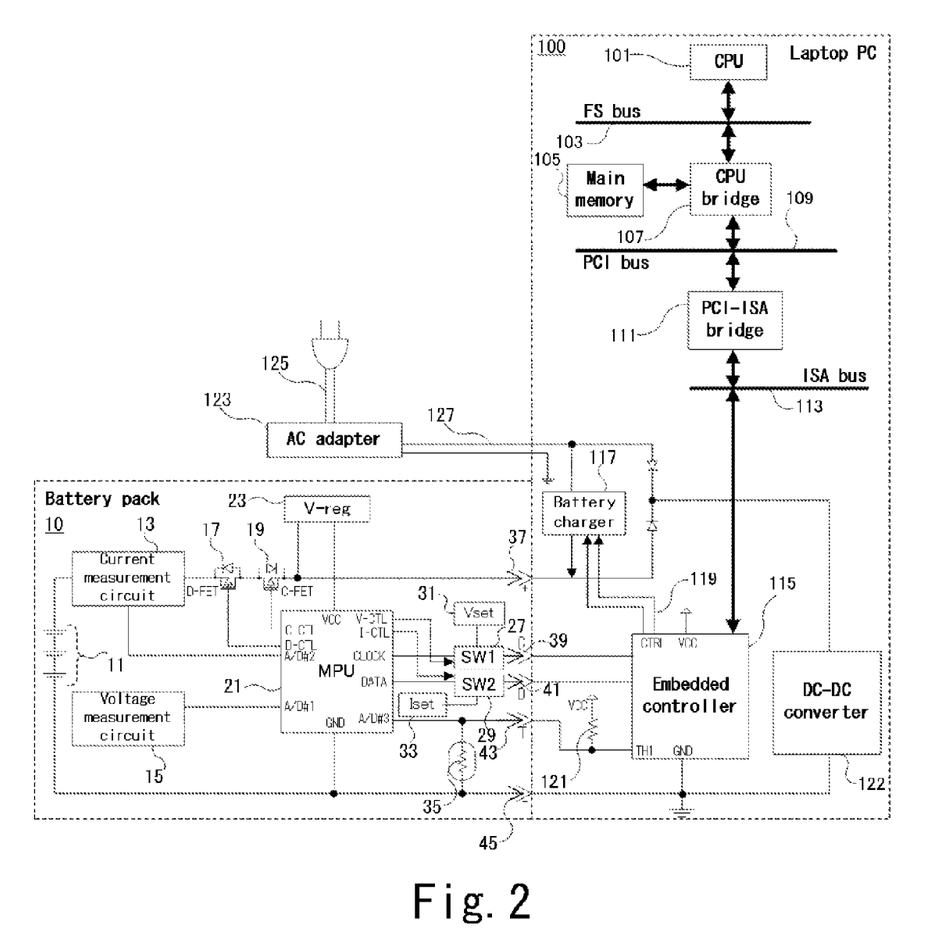
FIG. 2 shows a state in which a battery pack to which the present embodiment is applied is attached to a laptop PC.

FIG. 2 shows in detail the battery pack 10 shown in FIG. 1(A) attached to a laptop PC 100. The laptop PC 100 is the same as the conventional laptop PC shown in FIG. 8 and therefore the description thereof will be omitted. The battery pack 10 is similar to the conventional battery pack 10' shown in FIG. 8 and therefore only features of the present invention will be described.

The battery pack 10 includes a first selector switch (SW1) 27, a second selector switch (SW2) 29, a voltage setting section (Vset) 31, and a current setting section (Iset) 33 in addition to the components of the conventional battery pack 10'. The circuitry has been modified so that a voltage of the thermistor 35 is input into an analog input A/D #3 of an MPU 21. The MPU 21, provided inside the battery pack 10, is capable of operating the first selector switch (SW1) 27 and the second selector switch (SW2) 29. The first selector switch (SW1) 27 couples one of an output of CLOCK terminal of the MPU 21 and an output of the voltage setting section (Vset) 31 to the C terminal 39. The second selector switch (SW2) 29 couples one of an output of DATA terminal of the MPU 21 and an output of the current setting section (Iset) 33 to the D terminal 41. The output of the voltage setting section (Vset) 31 may be coupled to the D terminal 41 and the output of the current setting section (Iset) 33 may be coupled to the C terminal 39. The voltage setting section (Vset) 31 and the current setting section (Iset) 33 will be described later.

When the battery pack 10 is connected to the laptop PC 100, the MPU 21 operates the first selector switch (SW1) 27 and the second selector switch (SW2) 29 to connect the outputs of the CLOCK terminal and DATA terminal of the MPU 21 to the C terminal 39 and D terminal 41, respectively. Consequently, a clock line and a data line are connected from the MPU 21 to the embedded controller 115 of the laptop PC 100 through the C terminal 39 and the D terminal 41, respectively to enable communication between the MPU 21 and the embedded controller 115. The battery pack 10 identifies that either the laptop PC 100 or the external barter charger 50 the battery pack 10 has been connected as will be described hereafter.

Figure 3:
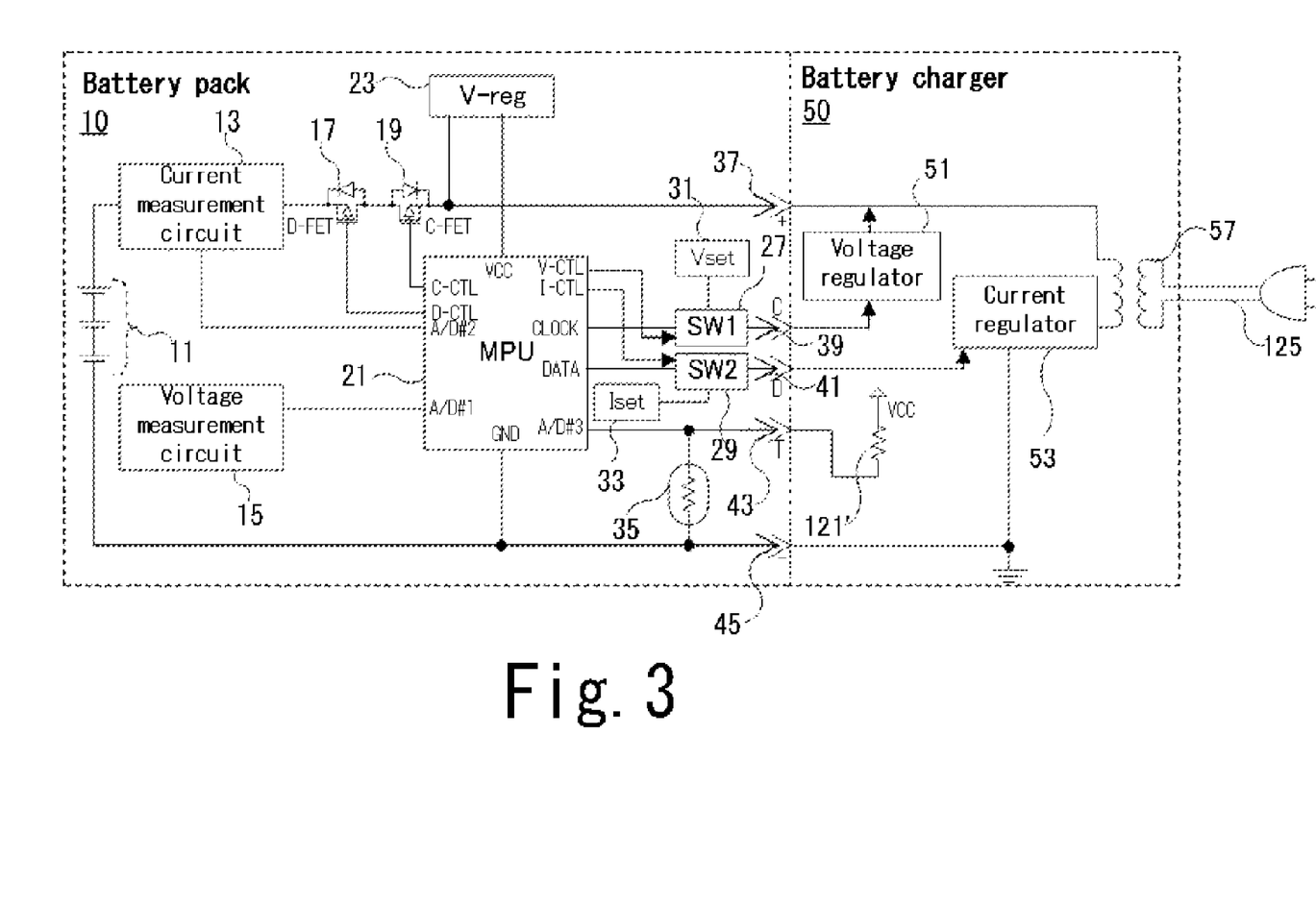
FIG. 3 shows a state in which the battery pack to which the present embodiment is applied is attached to an external battery charger.

FIG. 3 shows in detail the battery pack 10 shown in FIG. 1(B) attached to the external battery charger 50. The internal configuration of the battery pack 10 is the same as that of the battery pack connected to the laptop PC 100 shown in FIG. 2. The external battery charger 50 includes a voltage regulator 51, a current regulator 53, a transformer 57, and a pull-up resistance 121' connected to a thermistor 35 through the T terminal 43. The external battery charger 50 according to the present embodiment does not have an MPU and switches required by conventional external battery chargers. Furthermore, the external battery charger 50 according to the present embodiment includes the function of an AC adapter, which in the past has been separately provided for conventional external battery chargers. The external battery charger 50 of the present embodiment is capable of converting an AC voltage supplied from an AC power supply through the AC cord 125 to a DC voltage through use of the transformer 57. In addition, the external battery charger 50 may adjust a voltage value and a charging current value using the voltage regulator 51 and the current regulator 53. The pull-up resistance 121' is connected to a voltage source Vcc having a voltage value equal to that of the laptop PC 100 but has a resistance different from that of the pull-up resistance 121 of the laptop PC 100.

The parameters required for controlling charging of the battery pack 10 in a constant voltage constant current control (CVCC) mode are a charging voltage value and a charging current value. The type and physical characteristics of the battery cell 11 to be charged uniquely determine the charging voltage and current values. The voltage setting section (Vset) 31 generates a signal that provides a charge voltage value for charging the battery pack 10 to the external battery charger 50. Similarly, the current setting section (Iset) 33 generates a signal that provides a charging current value for charging the battery pack 10 to the external battery charger 50.

When the battery pack 10 is connected to the external battery charger 50, the MPU 21 operates the first selector switch (SW1) 27 and the second selector switch (SW2) 29 to connect the output of the voltage setting section (Vset) 31 and the output of the current setting section (Iset) 33 to the C terminal 39 and the D terminal 41, respectively. The voltage regulator 51 and the current regulator 53 receive the signals indicating the charging voltage value and the charging current value set by the voltage setting section (Vset) 31 and the current setting section (Iset) 33 through the C terminal 39 and the D terminal 41, and adjust the charging voltage and current values to the charging voltage value and the charging current value to perform charging. A specific method for determining the charging voltage and current values will be described later.

The MPU 21 determines whether the charging has been completed on the basis of a charging current and voltage measured at a current measurement circuit 13 and a voltage measurement circuit 15, respectively. If the MPU 21 determines that the charging has been completed, the MPU 21 turns off a D-FET 17 and a C-FET 19 to stop the charging of the battery pack 10. The external battery charger 50 has a simplified structure and does not include a switch that turns off its output voltage.

A voltage value of the thermistor 35 is input in the analog input A/D #3 of the MPU 21. The thermistor 35 is connected to a voltage source Vcc through a pull-up resistance 121' of the external battery charger 50 through the T terminal 43. Since the pull-up resistance 121' has a sufficiently high impedance, the voltage source Vcc does not influence temperature measurement by the embedded controller when the battery pack 10 is connected to the laptop PC 100 while the thermistor 35 is connected to the pull-up resistance 121'. The resistance values of the pull-up resistance 121' of the external battery charger 50 and the pull-up resistance 121 of the laptop PC 100 are different, so that the voltage value input into the analog input A/D #3 of the MPU 21 varies depending on whether the battery pack 10 is connected to the external battery charger 50 or the laptop PC 100. The difference in the voltage value input into the A/D #3 identifies which of the laptop PC 100 and the external battery charger 50 the battery pack 10 is connected to. Furthermore, the voltage value input in the A/D #3 readily identifies a state in which the battery pack 10 is connected to neither the external battery charger 50 nor the laptop PC 100. In that state, input and output of power are turned off by the D-FET 17 and the C-FET 19 mentioned above.

The MPU 21 identifies whether the battery pack 10 is connected to the external battery charger 50 or the laptop PC 100 from the voltage value input into the A/D #3. Therefore, various embodiments can be contemplated in addition to the example described above in which the external battery charger 50 and the laptop PC 100 differ in resistance values of pull-up resistance and/or voltage value of the voltage source Vcc. For example, the pull-up resistance values of the external battery charger 50 and the laptop PC 100 may be equal and the voltage values of the voltage sources Vcc may be different. In another example, both of the resistance values of the pull-up resistances and the voltage values of the voltage sources Vcc may differ between the external battery charger 50 and the laptop PC 100.

Figure 5:
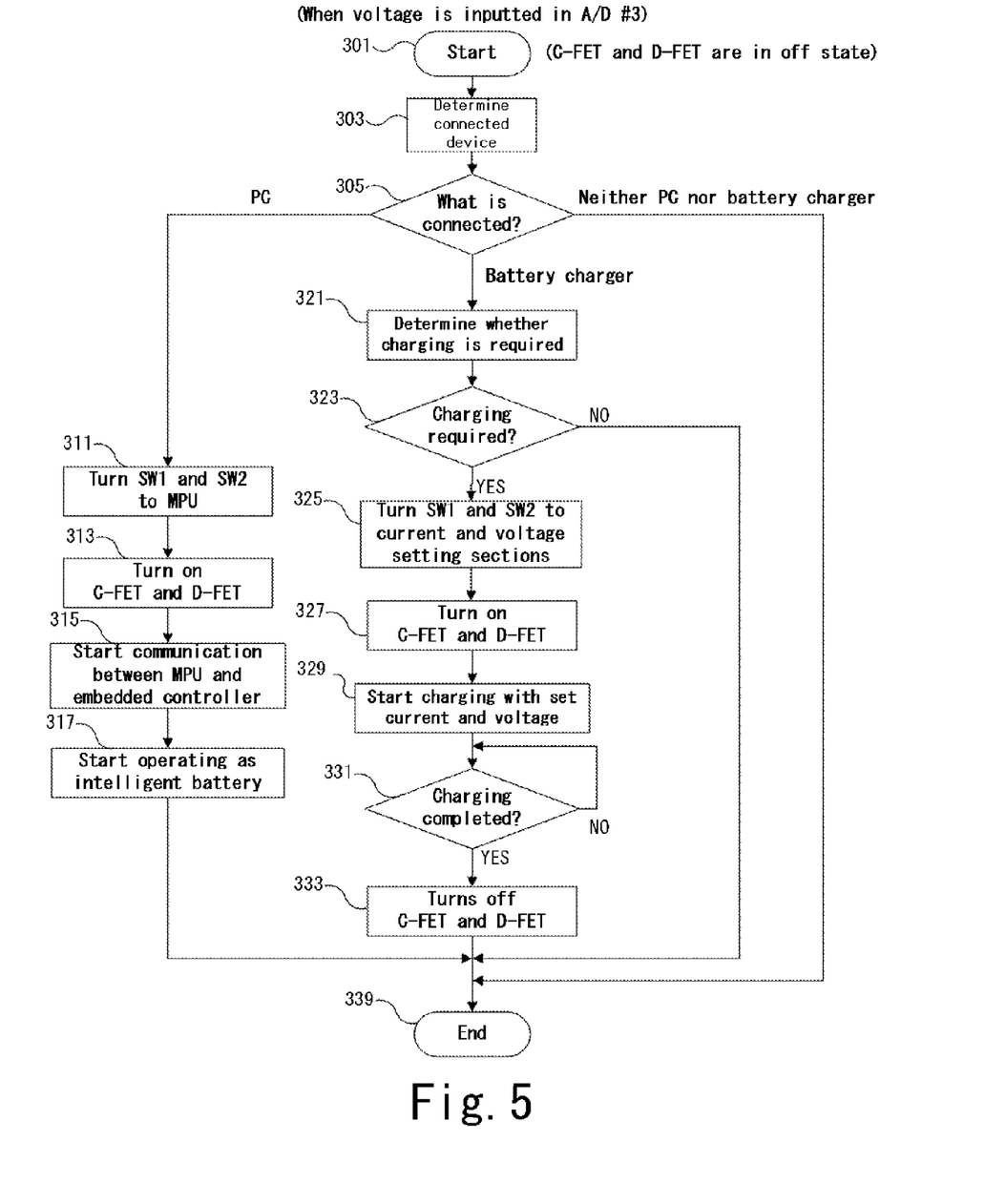
FIG. 5 is a flowchart showing operation of a program executed by an MPU in a battery pack to which the embodiment is applied.

The configuration of the battery pack 10 described above can be implemented by adding a few elements to a conventional battery pack 10' and making modifications to firmware inside the MPU 21 to cause it to perform operation as shown in FIG. 5, which will be described later. Thus, implementation of the battery pack 10 requires only minor modifications. Since the MPU 21 can also be omitted from the external battery charger 50, the external battery charger 50 can be significantly simplified in structure and can be manufactured at a low cost accordingly. Terminals for connecting an intelligent battery to a laptop PC 100 can be used to connect the battery pack 10 to the external battery charger 50. Therefore, no extra terminals need to be provided in the battery pack 10 and no modifications to software and hardware of the laptop PC 100 are required.

It should be noted that FIGS. 1 to 3 schematically show principle hardware configuration and connections for the purpose of illustrating the present embodiment. While many other electric circuits and devices are used in addition to these components to implement the battery pack 10, external battery charger 50, and laptop PC 100, they are well known to those skilled in the art and therefore are not described herein. It will be understood that multiple blocks shown in FIGS. 1 to 3 may be integrated into a single integrated circuit or a single block may be separated into multiple integrated circuits. Such implementations also fall within the scope of the present invention as is well known to those skilled in the art.

Figure 4:
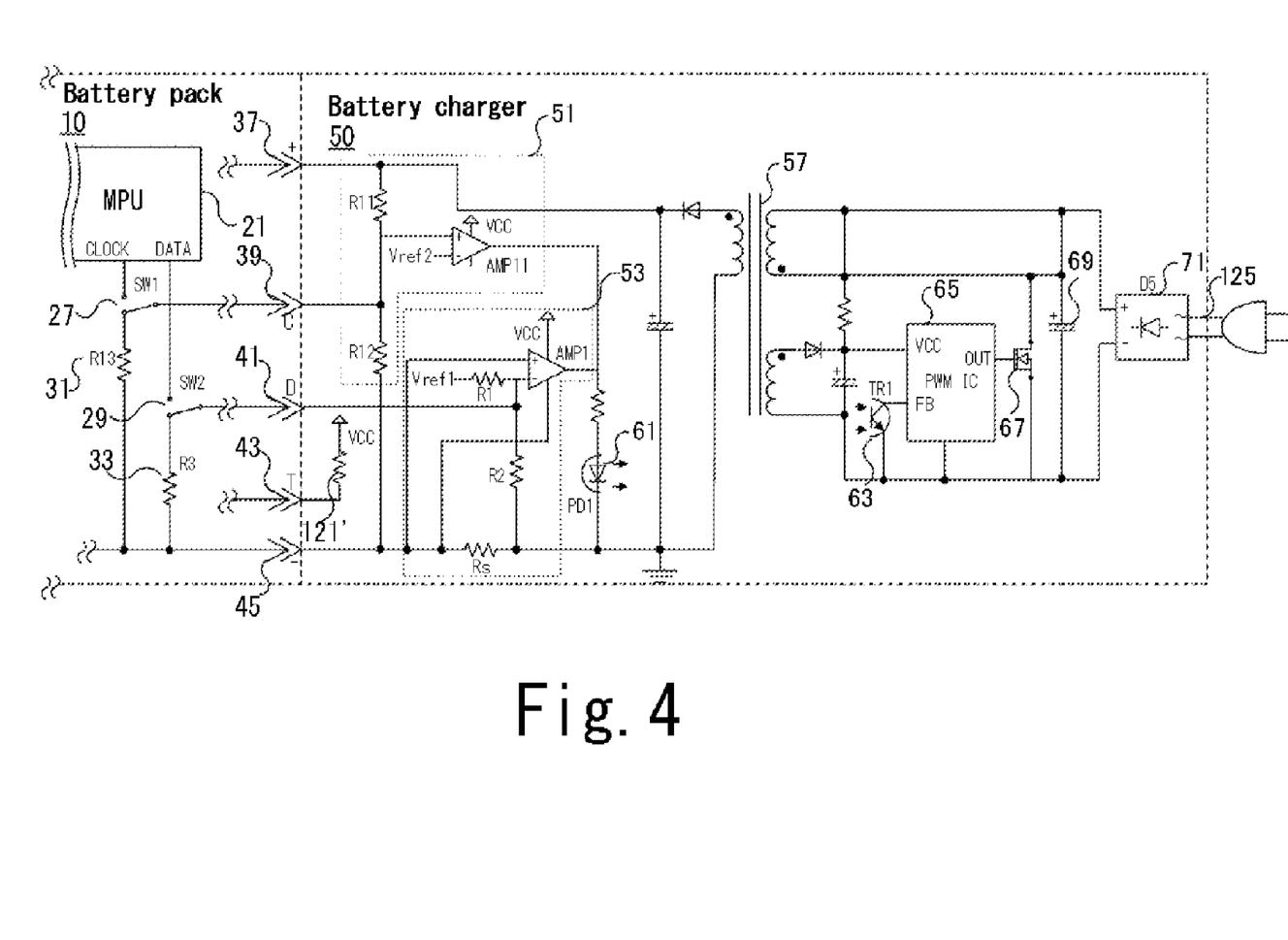
FIG. 4 shows a method for determining and controlling a charging voltage value and charging current value of an external battery charger to which the present embodiment is applied.

FIG. 4 shows determining and controlling the charging voltage and current values in the external battery charger 50 to which the present embodiment is applied. As described above, the external battery charger 50 includes the function of an AC adapter and operates on an AC voltage directly supplied through the AC cord 125. The AC voltage inputted through the AC cord 125 is first full-wave rectified by a rectifier bridge diode 71 on the primary side, and then smoothed by a capacitor 69, and provided to a primary-side coil of a transformer 57. Also provided on the primary side are a switching transistor 67 which makes switching operation on the voltage having been rectified and smoothed, a pulse width modulation (PWM) IC 65 which controls switching of the switching transistor 67 and provide a predetermined operation frequency, and a photo-transistor (TR1) 63 which receives an output feedback from the secondary-side photo-diode (PD1) 61 and controls the periodicity of PWM in accordance with the level of the output voltage.

On the secondary side, a photodiode (PD1) 61 for feeding outputs from the voltage regulator 51 and the current regulator 53 back to the primary side is provided in addition to the voltage regulator 51 and the current regulator 53. Since the primary circuitry must be electrically separated from the secondary circuitry for safety reasons, a photocoupler is used between the photodiode (PD1) 61 on the secondary side and the phototransistor (TR1) 63 on the primary side.

A resistance R13 31 provided inside the battery pack 10 functions as a voltage setting section (Vset) 31 that sets a charging voltage value Vchg. While the battery pack 10 is connected to the external battery charger 50, a first selector switch (SW1) 27 connects the resistance R13 31 to a C terminal 39. The difference between the charging voltage value Vchg and an actual charging voltage provided from the external battery charger 50 to the battery pack 10 is output from an operational amplifier AMP 11 in a voltage regulator 51 in the external battery charger 50 as the difference between a second reference voltage Vref2 and the input voltage. Here, equation (1) given below holds in the voltage regulator 51, where R11, R12, and R13 are resistances, Vchg is the charging voltage vlue, and Vref2 is the second reference voltage.

$$\frac{\left(\frac{R12*R13}{R12+R13}\right)*R12}{\left(\frac{R12*R13}{R12+R13}\right)+R11}*Vchg = Vref2 \qquad (1)$$

From the equation, the following equation (2) can be derived and the charging voltage value Vchg can be established according to equation (2).

$$Vchg = Vref2*\left(\frac{1}{R12} + \frac{R11}{R12+R13} + \frac{R11}{2*R12}\right) \qquad (2)$$

Resistance R3 provided in the battery pack 10 functions as a current setting section (Iset) 33 that sets a charging current value Ichg. When the battery pack 10 is connected to the external battery charger 50, a second selector switch (SW2) 29 connects R3 to a D terminal 41. The difference between the set charging current value Ichg and an actual charging current value provided from the external battery charger 50 to the battery pack 10 is output from an operational amplifier AMP1 in a current regulator 53 in the external battery charger 50 as the difference between a reference voltage Vref1 and the input voltage. Here, equation (3) given below holds in the current regulator 53, where Rs, R1, R2, and R3 are resistances, Ichg is the charging current value, and Vref1 is the first reference voltage.

$$\frac{\left(\frac{R2*R3}{R2+R3}\right)}{\left(\frac{R2*R3}{R2+R3}\right)+R1} * \frac{Vref1}{Rs} = Ichg \quad (3)$$

From this equation, equation (4) given below can be derived and the charging current value Ichg can be established.

$$Ichg = \left(\frac{R2}{\frac{R1*R2}{R3}+R1+R2}\right) * \frac{Vref1}{Rs} \quad (4)$$

As has been described above, the voltage setting section (Vset) 31 and the current setting section (Iset) 33 in the battery pack 10 in practice can set a charging voltage value and a charging current value according to equations (2) and (4) simply by setting resistance values R3 and R13. Therefore, the battery pack 10 can be implemented at an extremely low cost.

If an excess voltage or current is generated, an output equivalent to the excess current outputted from the AMP1 and an output equivalent to the excess voltage outputted from the AMP11 are combined and output to the photodiode (PD1) 61. The output from the photodiode (PD1) 61 is fed back to the power width modulator IC 65 on the primary side through the phototransistor (TR1) 63 which forms a photocoupler. When feedback equivalent to an excess voltage or current is provided to the phototransistor (TR1) 63, the pulse width modulator IC 65 reduces the pulse width by means of the switching transistor 67 to reduce the period during which the switching transistor 67 is in the on state. Thus, the charging voltage value and the charging current value are controlled to a constant level. Methods for controlling the voltage value and current value by using pulse width modulation in a switching-regulator-based power supply unit used for an AC adapter for laptop PCs are well known to those of skill in the art. The external battery charger 50 according to the present embodiment can be readily implemented by adding a voltage regulator 51 and a current regulator 53 to the power supply unit so that outputs from the AMP1 and AMP11 are inputted into the photodiode (PD1) 61.

FIG. 5 is a flowchart of an operation of a program executed by the MPU 21 when the battery pack 10 described above is connected to the laptop PC 100 or the external battery charger 50. The program is provided as firmware stored in the MPU 21. It should be noted that the D-FET 17 and C-FET 19 are in the off state when the program shown in FIG. 5 is activated because the battery pack 10 turns off the D-FET 17 and C-FET 19 when the battery pack 10 is connected to neither the external battery charger 50 nor the laptop PC 100.

First, when a voltage is input into the analog input A/D #3 of the MPU 21, it is determined that the battery pack 10 is likely to have been connected to the laptop PC 100 or the external battery charger 50 and the program is activated (block 301). Then, determination is made as to whether the battery pack 10 is connected to the laptop PC 100 or the external battery charger 50 (blocks 303 through 305). More specifically, if the voltage input into the analog input A/D #3 indicates the resistance value of the pull-up resistance 121' of the external battery charger 50, it is determined that the battery pack 10 is connected to the external battery charter 50. On the other hand, if the input voltage indicates the resistance value of the pull-up resistance 121 of the laptop PC 100, it is determined that the battery pack 10 is connected to the laptop PC 100. If the input voltage indicates neither of these values, it is determined that the battery pack 10 is connected to neither of the laptop PC 100 nor the external battery charger 50 and the process will end (block 339).

If it is determined that the battery pack 10 is connected to the laptop PC 100, the first selector switch (SW1) 27 and the second selector switch (SW2) 29 are switched to connect the outputs of the CLOCK terminal and DATA terminal of the MPU 21 to the C terminal 39 and D terminal 41, respectively (block 311). Then, the D-FET 17 and the C-FET 19 are turned on (block 313). As a result, communication between the MPU 21 and the embedded controller 115 is started (block 315). The battery pack 10 starts functioning as an intelligent battery (block 317) and then the operation of the program will end (block 339). The present current value and voltage value of the battery pack 10 are sent to the laptop PC 100 through communication between the MPU 21 and the embedded controller 115. If the battery pack 10 needs to be charged, charging power is provided from a charger 117 on the laptop PC 100.

On the other hand, if it is determined that the battery pack 10 is connected to the external battery charger 50, determination is made first as to whether the battery pack 10 needs to be charged (blocks 321 and 323) on the basis of a current value and voltage value measured by a current measurement circuit 13 and a voltage measurement circuit 15. If the battery pack 10 does not need to be charged, the operation of the program will end (block 339). If the battery pack 10 needs to be charged, the first selector switch (SW1) 27 and the second selector switch (SW2) 29 are switched to connect the outputs of the voltage setting section (Vset) 31 and the current setting section (Iset) 33 to the C terminal 39 and the D terminal 41, respectively, (block 325) to set a charging voltage value and current value to be outputted. After the charging voltage and current values are set, the D-FET 17 and the C-FET 19 are turned on (block 327) to provide the set charging voltage and current values to the battery pack 10, thereby staring charging of the battery pack 10 (block 329). On completion of the charging (block 331), the D-FET 17 and the C-FET 19 are turned off, thereby ending the charging (block 333), and the operation of the program will end (block 339).

Figure 6:
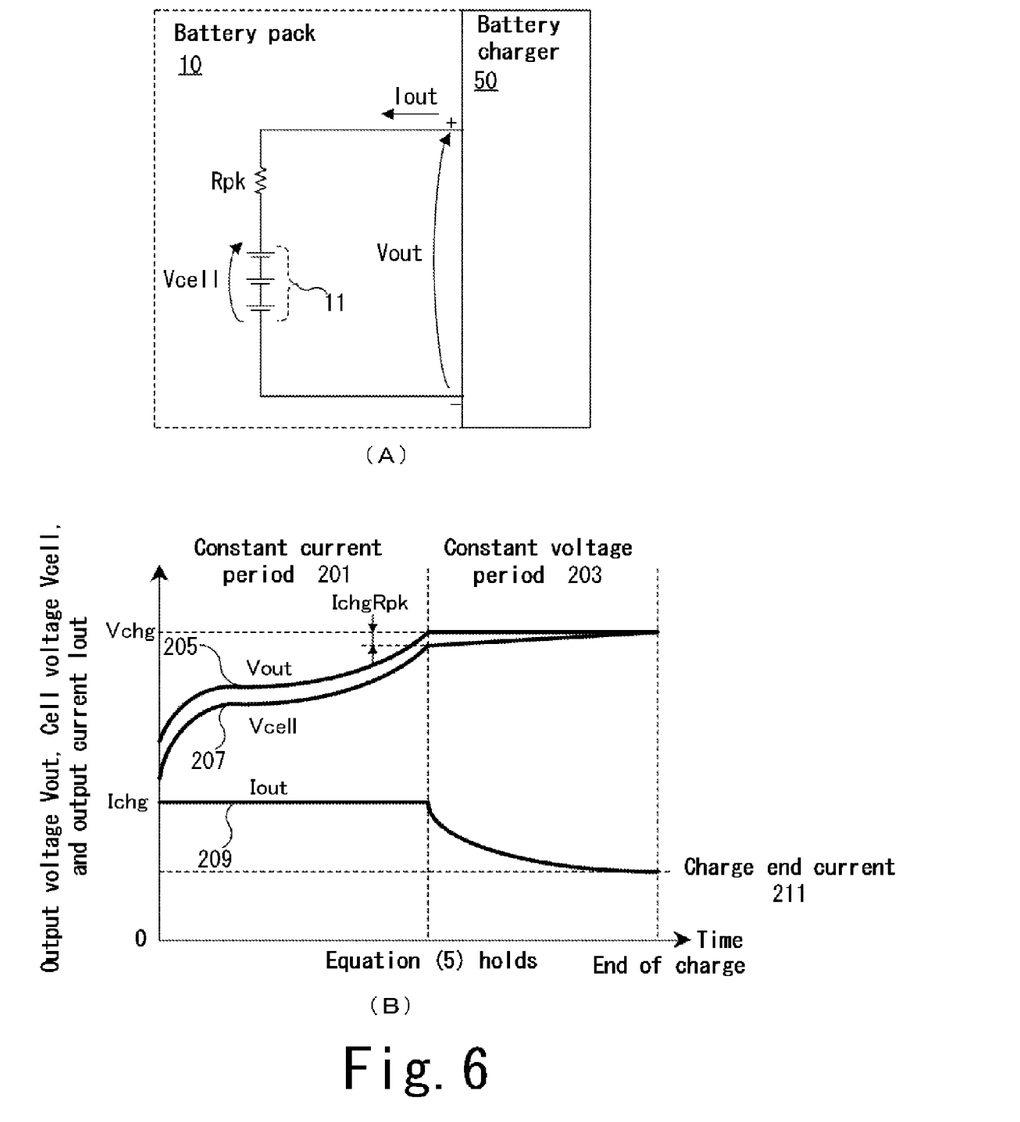
FIG. 6 shows a charging voltage and a charging current during charging of a battery pack to which the present embodiment is applied.

FIG. 6 shows a charging voltage and a charging current during charging of the battery pack 10. FIG. 6(A) is a block diagram of the battery pack 10 viewed from near the battery cells 11 during charging and shows where a voltage Vout and current Iout are measured; FIG. 6(B) shows changes in the voltage Vout and the current Iout output from the external battery charger 50. If the battery cells 11 are lithium-ion cells, charging is performed in a constant voltage/constant current control mode. Hereafter, the charging voltage value set by the voltage setting section (Vset) 31 is denoted by Vchg, the charging current value set by the current setting section (Iset) 33 is denoted by Ichg, the voltage across the cell is denoted by Vcell, and the DC resistance of the cell (excluding the DC resistance of the battery pack 10) is denoted by Rpk. The constant current period 201 is a time period during which charging is performed at a constant current value. As represented by curve 209 in FIG. 6(B), the current Iout is kept at the set current value Ichg during the constant current period 201. The voltages Vout and Vcell gradually increase as represented by curves 205 and 207. When the voltage Vcell reaches a value at which Equation (5) is satisfied, the voltage Vout becomes equal to the set voltage value Vchg and a constant voltage period 203 is entered.

$$Vchg = IchgRpk + Vcell \qquad (5)$$

In the constant voltage period 203, the voltage Vout remains at the set voltage value Vchg, the voltage Vcell gradually approaches Vchg, and the current Iout gradually decreases. The voltage Vout becomes approximately equal to Vcell. When the current Iout becomes equal to the set charging end current 211, the charging of the battery pack 10 ends. The MPU 21 constantly monitors the values of Vcell and Iout through the voltage measurement circuit 15 and the current measurement circuit 17 provided inside the battery pack 10. When a charging end state is reached, the MPU 21 turns off the D-FET 17 and the C-FET 19, thereby completing the charging.

The voltage value and current value suitable for charging a battery pack 10 vary depending on the structure and physical characteristics of the battery pack 10. Conventionally, the MPU 21 of a battery pack 10 has indicated a charging voltage value and charging current value to be set to an external battery charger 50 through communication with the MPU of the external battery charger 50. According to the present invention, internal resistance values in the voltage setting section and the current setting section are also set in the external battery charger 50 having an inexpensive and simple structure without an MPU, whereby each individual battery pack 10 can hold information about a voltage value and a current value suitable for charging of the battery pack 10. This eliminates the need for providing different external battery chargers 50 for different types of battery packs 10 but instead a single external battery charger 50 can be used for charging many types of battery packs 10.

Furthermore, according to the present embodiment, a charging voltage value and a charging current value can be readily set by using only internal resistance values in the voltage setting section and the current setting section. Therefore, if a single battery pack 10 requires multiple sets of charging voltage and charging current values, the charging voltage and charging current values can be set simply by selecting values from among multiple resistance values provided inside the voltage setting section and the current setting section by using selector switches. Since the numbers of switches and resistances in the battery pack 10 are only slightly increased, the manufacturing cost of the battery pack 10 is not significantly increased and an external battery charger 50 in the same embodiment described above may be used.

In an alternative embodiment, as a voltage setting section and a current setting section, voltages equivalent to a charging voltage and current values instead of resistance values may be directly provided from the analog output of the MPU 21 to a voltage regulator 51 and a current regulator 53. The alternative embodiment also can be implemented by making slight modifications to firmware in the MPU 21 and switches in the battery pack 10.

While the present invention has been described with respect to the specific embodiment shown in the drawings, the present invention is not limited to the embodiment shown in the drawings. It will be understood that any equivalent configurations may be used as long as they provide the effects of the present invention.

The present invention can be applied to a charging system including a battery pack 10 having an internal processor therein and an external battery charger 50. In addition, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A charging system for a battery pack attachable to an electronic apparatus having an identification circuit, comprising:

an external battery charger comprising an identification circuit and a charging regulator whose charging characteristics are controlled in accordance with charging parameter values received from an external source; and a battery pack comprising a battery cell and a processor capable of recognizing the identification circuit of the electronic apparatus and the identification circuit of the external battery charger and, upon recognizing the identification circuit of the external battery charger, sending the charging parameter values to the charging regulator.

2. The charging system according to claim 1, wherein the charging regulator comprises a voltage regulator and a current regulator that implement constant voltage constant current control mode and the charging parameter values comprise a charging voltage value and a charging current value.

3. The charging system according to claim 1, wherein the charging parameter values are sent to the external battery charger through a data line and a clock line to the processor.

4. The charging system according to claim 1, wherein the battery pack comprises a temperature measurement circuit including a thermistor, and each of the identification circuit of the electronic apparatus and the identification circuit of the external battery charger has a pull-up resistance capable of being connected to the temperature measurement circuit.

5. A battery pack attachable to an electronic apparatus comprising an identification circuit and capable of being charged by an external battery charger that includes an identification circuit and a charging regulator, the battery pack comprising:

a battery cell;

an external terminal connectable to the electronic apparatus and the external battery charger; and a processor connectable to the identification circuit of any of the electronic apparatus and the external battery charger and upon recognizing the identification circuit of the electronic apparatus, sends information about charging of the battery cell to the electronic apparatus, and upon recognizing the identification circuit of the external battery charger, sends charging parameter values of the battery cell to the charging regulator.

6. The battery pack according to claim 5, wherein the charging parameter values are sent to the external battery charger through a data line connected to data terminal of the processor and a clock line connected to a clock terminal of the processor.

7. The battery pack according to claim 6, comprising a parameter setting section and a selector switch connected to the external terminal, the data terminal, the clock terminal, and the parameter setting section, wherein the processor controls the selector switch to connect the parameter setting section to the external terminal when the processor recognizes the identification circuit of the external battery charger, and to connect the data terminal and the clock terminal to the external terminal when the processor recognizes the identification circuit of the electronic apparatus.

8. The battery pack according to claim 5, comprising a charging switch which controls a charging current provided to the battery cell, wherein the processor turns off the charging switch when the processor does not recognize the identification circuit of the electronic apparatus and the identification circuit of the external battery charger.

9. The battery pack according to claim 5, wherein the processor sends the charging parameter values of the battery cell before turning on the charging switch when the battery pack is connected to the external battery charger.

10. The battery pack according to claim 5, comprising a thermistor, wherein the processor recognizes the electronic apparatus and the external battery charger on the basis of a voltage generated across the thermistor.

11. The battery pack according to claim 5, wherein the battery pack is compliant with a Smart Battery System specification.

12. A laptop personal computer to which a battery pack can be attached and which operates on power supplied from the battery pack, wherein the battery pack is a battery pack according to any of claims 5 to 11.

13. An charging system comprising:
    an external battery charger comprising an identification circuit and a charging regulator whose charging characteristics are controlled in accordance with charging parameter values received from an external source;
    an electronic apparatus comprising an identification circuit; and
    a battery pack comprising a battery cell and a processor, recognizing the identification circuit of the electronic apparatus and the identification circuit of the external battery charger and, upon recognizing the identification circuit of the electronic apparatus, sending information about charging of the battery cell to the electronic apparatus and upon recognizing the identification circuit of the external battery charger, sending the charging parameter values to the charging regulator.

14. The external battery charger according to claim 13, comprising a transformer connected to an alternating current power supply.

15. The external battery charger according to claim 13, wherein the charging regulator receives the charging parameters through a data line and a clock line of the battery pack.

16. A method for using an external battery charger to charge a battery pack that is attachable to an electronic apparatus, the method comprising the steps of:
    connecting the battery pack to the external battery charger, the external battery charger comprising an identification circuit and a charging regulator whose charging characteristics are controlled in accordance with charging parameter values received from an external source, the battery pack comprising a battery cell and a processor, the electronic apparatus comprising an identification circuit;
    recognizing, by use of the processor, the identification circuit of the external battery charger and the identification circuit of the electronic apparatus;
    providing, by use of the processor, charging parameters of the external battery charger to the battery pack;
    sending, by use of the processor, the charging parameters to the external battery charger in response to the recognizing the identification circuit of the external battery charger; and
    charging by the external battery charger the battery cell in accordance with the charging parameters.

17. The charging method according to claim 16, wherein sending the charging parameters comprises sending the charging parameters through a data line and a clock line that transfer data compliant with a Smart Battery System specification.

18. The charging method according to claim 16, comprising the steps of:
    turning off a charging switch that controls a charging circuit of the battery pack; and
    turning on the charging switch subsequent to sending the charging parameters.

* * * * *